United States Patent

Sato et al.

[11] Patent Number: 5,956,970
[45] Date of Patent: Sep. 28, 1999

[54] HYDROGEN PURIFY IMPROVING METHOD AND THE APPARATUS FOR THE SAME

[75] Inventors: Junichi Sato; Yusaku Nishimura, both of Hyogo; Harunobu Takeda, Hokkaido; Yukio Sato, Hokkaido; Shoichi Sato, Hokkaido; Yuichi Wakisaka, Hokkaido, all of Japan

[73] Assignees: The Kansai Electric Power Company, Inc., Osaka; The Japan Steel Works, Ltd., Tokyo, both of Japan

[21] Appl. No.: 08/984,333

[22] Filed: Dec. 3, 1997

[51] Int. Cl.[6] ............................................. F25J 3/08
[52] U.S. Cl. .................................. 62/617; 62/636; 62/931
[58] Field of Search .................................. 62/46.1, 46.2, 62/617, 636, 931

[56] References Cited

PUBLICATIONS

Database WPI Section Ch, Week 9803 Derwent Publications Ltd. London, GB; Class E36, AN 98–027907 XP002064777 & JP 09 286 601 A (Japan Steel Works LTD) Nov. 4, 1997 *Abstract.
Patent Abstracts of Japan vol. 096., No. 002, Feb. 29, 1996 & JP 07 267607 A (Kansai Electric Power Co Inc: The; Others: 1), Oct. 17, 1995 *Abstract.
Patent Abstracts of Japan vol. 009, No. 331 (C–321), Dec. 25, 1985 & JP 60 161305 A (Sekisui Kagaku Kogyo KK) Aug. 23, 1985 *Abstracts.
Patent Abstracts of Japan vol. 012 No. 344 (C–528), Sep. 16, 1988 & JP 63 103801 A (Nippon Sanso KK) Aug. 9, 1988, *Abstract.
Patent Abstracts of Japan vol. 016, No. 081 (C–0915) Feb. 27, 1992 & JP 03 271101 A (Japan Steel Works LTD: The; Others: 01) Dec. 3, 1991 *Abstract.
Database WPI Section Ch, Week 9810, Derwent Publications Ltd., London, GB; Class E36, AN 98–104986 XP002064778 & JP 09 328 301 A (Japan Steel Works LTD) Dec. 22, 1997 *Abstract.

*Primary Examiner*—Christopher B. Kilner
*Attorney, Agent, or Firm*—Sughrue, Mion, Zinn, Macpeak & Seas, PLLC

[57] ABSTRACT

Hydrogen gas from an generator (1) is occluded in a hydrogen recovery container (20), thereafter, in the initial stage during which hydrogen gas is released from the hydrogen recovery container (20), initially purged hydrogen gas containing much amount of impure gas is introduced from the hydrogen recovery container (20) to a gas tank (2) and saved therein, then, hydrogen gas having high purity released from a hydrogen absorbing alloy in the hydrogen recovery container (20) is refluxed to the generator (1), and this process comprising absorbing and releasing of hydrogen gas in the hydrogen recovery container (20) and saving in the gas tank (2) is repeated once or several times, successively, the hydrogen gas containing much amount of impure gas saved in the gas tank (2) is introduced in the hydrogen recovery container (20) and occluded therein, thereafter, in the initial stage during which hydrogen gas is released from the hydrogen recovery container (20), the hydrogen gas containing much amount of impure gas is discharged outside, then hydrogen gas having high purity released from the hydrogen absorbing alloy in the hydrogen recovery container (20) is refluxed to the generator (1).

7 Claims, 1 Drawing Sheet

HYDROGEN PURIFY IMPROVING METHOD AND THE APPARATUS FOR THE SAME

BACKGROUND OF THE INVENTION

1. Field of the Invention

The present invention relates to a process for improving hydrogen purity and the apparatus for effecting the same.

2. Related Art

A conventional hydrogen purity improving method is the batch system described in JP-A-3-27110 and 7-267607. According to such a system, while hydrogen is actively recovered from an impure gas source from a generator so that it may be reused, a remaining amount of impure gas is discharged to the atmosphere, whereby improvement in the hydrogen purity is conducted effectively.

The apparatus described in JP-A-3-271101 is characterized in that a hydrogen-utilizing generator and a hydrogen recovery container having a heating unit, a cooling unit and a hydrogen absorbing alloy therein, are connected with a pipe having a first pressure-controlling valve. In addition, the hydrogen recovery container employs a purging gas line having a second pressure-controlling valve activated with respect to a pressure corresponding to the internal pressure of the hydrogen recovery container. A product gas line having the first valve and a discharging gas line having the second valve are respectively connected with the hydrogen recovery container.

According to this hydrogen purity improving apparatus, hydrogen gas in the hydrogen-utilizing unit is sufficiently occluded in a hydrogen absorbing alloy in the hydrogen recovery container. Next, in releasing hydrogen gas from the hydrogen recovery container, hydrogen gas, including a substantial amount of impure gas from the hydrogen recovery container, is momentarily released from the releasing gas line. Thereafter, hydrogen gas having a high purity, released from the hydrogen absorbing alloy, is returned to the hydrogen-utilizing unit through the product gas line.

Since this apparatus is equipped with only one hydrogen recovery container, the construction of the apparatus is simple, which is resulted in a low cost, and the maintenance of the apparatus is reasonable. However, the technical problem of a low hydrogen recovery may arise. Namely, after introducing hydrogen gas in the hydrogen-utilizing unit into the hydrogen recovery container according to the batch manner, hydrogen gas including a substantial amount of impure gas from the hydrogen recovery container is released outside through the releasing gas line in the initial stage where hydrogen is released from the absorbing alloy. Thus, hydrogen included in the purged impure gas cannot be recovered.

On the other hand, the hydrogen purity improving apparatus described in JP-A-7-267607 is characterized by a hydrogen-utilizing generator connected in parallel with, plural hydrogen recovery containers. Each hydrogen recovery container employs a hydrogen absorbing alloy occluding hydrogen as a hydride, a cooling unit and a heating unit. A first valve and a second valve each having a switch function are provided at the hydrogen inlet side of each parallel hydrogen recovery container. In addition, a third valve and a fourth valve are provided at the hydrogen outlet side of each hydrogen recovery container, each having a switch function. A recycling pipe is connected in line with each hydrogen recovery container and equipped with valves arranged in series and having a switch function. Purging gas lines having a purging valve are connected with each hydrogen recovery container at the hydrogen outlet side thereof.

According to this conventional hydrogen purity improving apparatus, hydrogen can be recovered from the purged gas from one hydrogen recovery container and reused. Thus, hydrogen recovery is improved. However, hydrogen gas including a substantial amount of impure gas is introduced into another hydrogen recovery container in which the impure gas-containing hydrogen gas is occluded again in the hydrogen absorbing alloy. Therefore, plural hydrogen recovery containers having a complicated structure are required, which results in a high cost. Further, the maintenance of the apparatus is significant. Still further, since oxygen which is harmful to the hydrogen absorbing alloy comes into contact with the hydrogen absorbing alloy for a longer period of time, potential deterioration of the hydrogen absorbing alloy is increased within a short time even though a substantial amount of the hydrogen absorbing alloy is accommodated in the plural hydrogen recovery containers.

SUMMARY OF THE INVENTION

The present invention has been achieved with a view of overcoming such conventional technical problems. The construction is as follows:

The present invention is defined by a process for improving hydrogen purity characterized in that a hydrogen recovery container connected with a hydrogen-cooling type generator and accommodating a hydrogen absorbing alloy occluding hydrogen as a hydride is also connected with an auxiliary gas tank. Hydrogen gas from the generator is absorbed by the absorbing alloy in the hydrogen recovery container. Thereafter, in the initial stage during which hydrogen gas is released from the hydrogen recovery container, initially purged hydrogen gas containing a substantial amount of impure gas is diverted from the hydrogen recovery container to the auxiliary gas tank for storage. Then, hydrogen gas having a high purity, released from the hydrogen absorbing alloy in the hydrogen recovery container, is refluxed to the generator. This process comprising the absorbing and releasing of hydrogen gas in the hydrogen recovery container and storing in the auxiliary gas tank is effected once or several times in succession. Thus, the hydrogen gas containing a substantial amount of impure gas stored saved in the auxiliary gas tank is introduced in the hydrogen recovery container for absorption. Thereafter, when the hydrogen gas is initially released from the absorbing alloy, the hydrogen gas containing a substantial amount of impure gas is discharged outside. Finally, hydrogen gas having a high purity, released from the hydrogen absorbing alloy in the hydrogen recovery container, is refluxed to the generator.

An additional embodiment of the present invention is defined by a further process for improving hydrogen purity in that after the hydrogen gas containing a substantial amount of impure gas saved in the auxiliary gas tank is introduced in the hydrogen recovery container and absorbed therein, during the initial stage during which hydrogen gas is released from the absorbing alloy, hydrogen gas containing a substantial amount of impure gas is stored in a second auxiliary gas tank Thereafter, hydrogen gas having a high purity, released from the hydrogen absorbing alloy in the hydrogen recovery container, is refluxed to the generator. The process is repeated once, or to several times in succession. The impure gas saved stored in another the second auxiliary gas tank is introduced into the hydrogen recovery container and absorbed therein. Thereafter, in the initial stage during which hydrogen gas is released from the absorbing alloy, the hydrogen gas, within the recovery container, containing a substantial amount of impure gas is discharged outside. Then, hydrogen gas having a high purity, released from the hydrogen absorbing alloy, is refluxed to the generator.

A further embodiment of the present invention is defined by an apparatus for improving hydrogen purity comprising a hydrogen-cooling type generator, a hydrogen recovery container connected by a pipe with the generator for absorption and accommodating a hydrogen absorbing alloy that absorbs hydrogen as a hydride, a first valve provided in the pipe having a switch function, a product gas line connecting the hydrogen recovery container with the generator, a second valve provided in the product gas line having a switch function, a gas tank connected with the hydrogen recovery container through a tank pipe for storing hydrogen gas in the internal space thereof, a fourth valve provided in the tank pipe having a switch function, and a purging gas line connected with the hydrogen recovery container equipped with a third gas valve having a switch function.

DETAILED DESCRIPTION OF THE PREFERRED EMBODIMENTS

Figure 1:
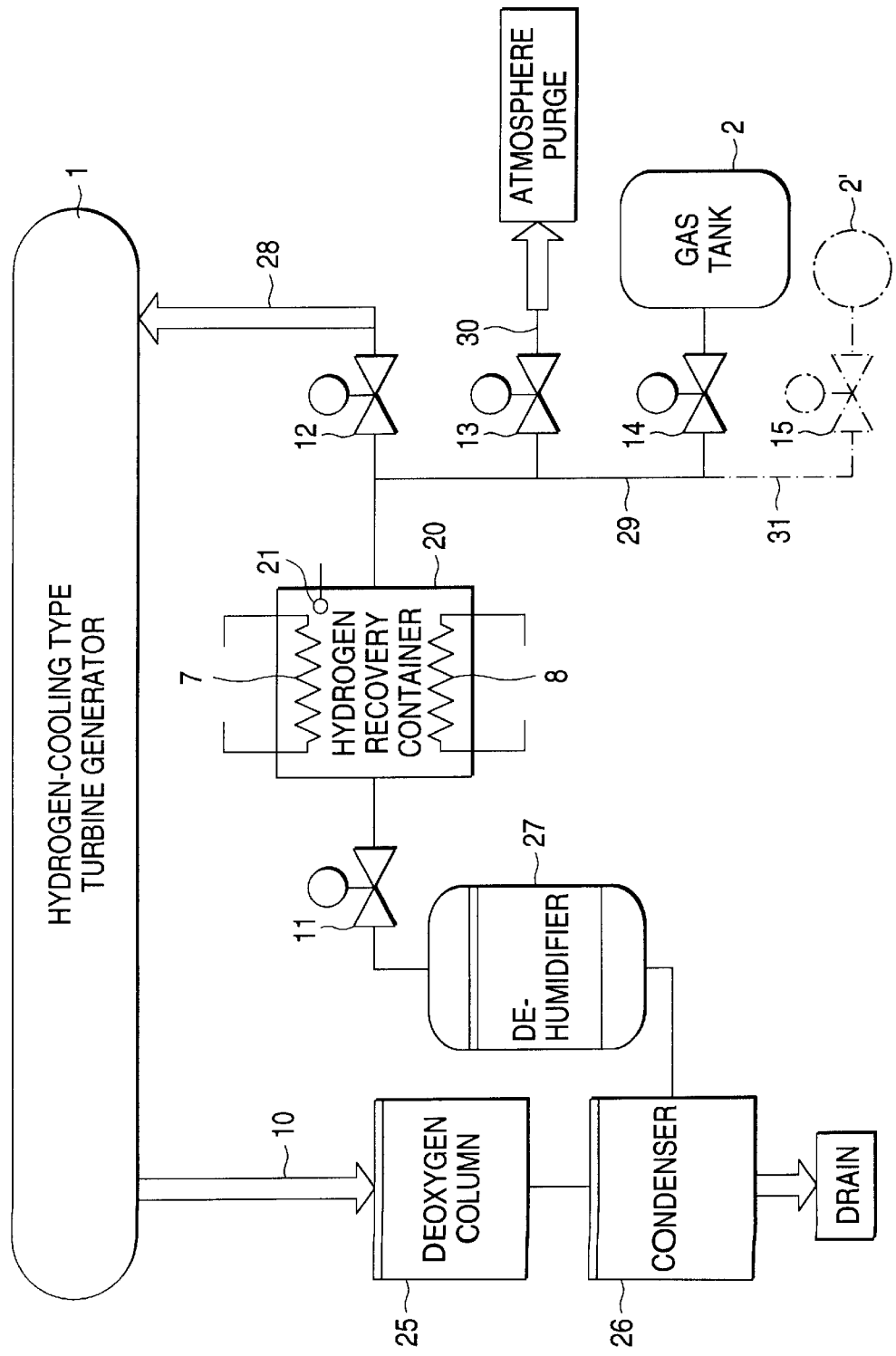
FIG. 1 is a schematic drawing showing a hydrogen purity improving apparatus according to an embodiment of the present invention.

One embodiment of the present invention will be explained below by way of FIG. 1.

In FIG. 1, 1 represents a hydrogen-cooling type turbine generator discharging impure gas including a hydrogen component after having been used. 20 represents a hydrogen recovery container which accommodates a hydrogen absorbing alloy occluding hydrogen as a hydride (metal hydride), equipped with a heating unit 7 for heating the hydrogen absorbing alloy and a cooling unit 8 for cooling the same, and a pressure gage 21 for detecting internal pressure.

The cooling unit 8 cools the hydrogen absorbing alloy so that the alloy may absorb hydrogen. For example, the cooling unit 8 may be a cold water supply. A heating unit 7 heats the hydrogen absorbing alloy so that the alloy may release hydrogen. For example, the heating unit 7 may be a hot water supply or an electric heater. The hydrogen absorbing alloy reacts with hydrogen gas to reversibly occlude or release the hydrogen gas. This reaction proceeds depending upon the hydrogen equilibrium pressure-temperature characteristics in a plateau region. According to temperature conditions at a hydrogen equilibrium pressure, hydrogen gas is occluded by cooling to a low temperature and it is released by heating to a high temperature. The usual heating unit 7 in the hydrogen recovery container 20 releases hydrogen gas by heating the hydrogen absorbing alloy at around 50 to 98° C. Alternatively, by using steam, hydrogen gas can be released by heating to around 100 to 170° C. The pipe for absorption 10 connected at one end thereof with the hydrogen outlet part of the generator 1 is sequentially equipped with a deoxygen column 25, a condenser 26, and a dehumidifier 27 as well as a first valve 11 having a switch function. Another end thereof is connected with the hydrogen recovery container 20. The condenser 26 and the dehumidifier 27 constitute a dehumidifying treatment unit. A product gas line 28 equipped with a second valve 12 having a switch function is connected with the hydrogen recovery container 20 at one end thereof and at another end, it is connected with the hydrogen inlet part of the generator 1.

One end of a tank pipe 29 is connected with the hydrogen recovery container 20. Specifically, it is connected with the product gas line 28 between the hydrogen recovery container 20 and the second valve 12. Further, a purging gas line 30 equipped with a third valve 13, i.e., purging valve, having a switch function is connected with the hydrogen recovery container 20. Specifically, with a middle part of the tank gas pipe 29. Still further, at another end of the tank pipe 29 a gas tank 2 for recycling is connected and equipped with a fourth valve 14 for storing hydrogen gas containing a substantial amount of impure gas. The gas tank 2 can be constructed as a usual tank or with an accumulator. As a matter of course, the gas tank 2 does not accommodate a hydrogen absorbing alloy.

Next, the function of the above-described hydrogen purity improving apparatus will be explained below.

The hydrogen purity inside the generator 1 is improved and maintained by using the hydrogen recovery container 20 according to a batch system. Namely, while simultaneously opening the first valve 11, the second valve 12 through the fourth valve 14 are all closed. Further, by cooling the hydrogen recovery container 20 by means of the cooling unit 8, hydrogen gas having relatively low purity in the generator 1 is introduced into the hydrogen recovery container 20. The hydrogen gas having relatively low purity in the generator 1 is passed through the pipe for absorption 10. In the course of passing, oxygen harmful to the hydrogen absorbing alloy is removed by the deoxygen column 25 and water harmful to the hydrogen absorbing alloy is removed by the condenser 26 and the dehumidifier 27. The water removed by the condenser 26 is discharged outside. Thus, with flowing hydrogen gas from the generator 1 to the hydrogen recovery container 20, the hydrogen is sufficiently occluded in the hydrogen absorbing alloy in the hydrogen recovery container 20.

At the time of finishing this portion of the hydrogen absorbing process, the pressure inside the hydrogen recovery container 20 is temporarily raised by the occupation of the hydrogen recovery container 20 with hydrogen gas. This rise in pressure is detected by a pressure gage in the hydrogen recovery container 20 and depending upon the detected signal, the first valve 11 is closed. The first valve can also be closed by time control. In such a case, a given time having passed after opening the first valve 11 is detected by a timer, thereafter, the valve may be closed.

Next, the hydrogen absorbing alloy in the hydrogen recovery container 20 is heated by the heating unit 7 so that hydrogen may be released. In this case, in the initial stage of releasing hydrogen, the fourth valve 14 is momentary opened without fail to effect initial purging. By momentary opening the fourth valve 14, hydrogen gas containing a substantial amount of impure gas which was not occluded and, therefore, present within the hydrogen recovery container 20, is introduced into the auxiliary gas tank 2 through the piping for the tank 29.

During the initial purging of hydrogen gas containing a substantial amount of impure gas this gas is introduced into the auxiliary gas tank 2 which does not contain the hydrogen absorbing alloy. According to such construction, the impure gas is prevented from contacting the hydrogen absorbing alloy for a long time in comparison with the case where hydrogen gas containing a substantial amount of this impure gas is introduced into the hydrogen recovery container comprising the hydrogen absorbing alloy. Thus, early deterioration of the hydrogen absorbing alloy accommodated in the hydrogen recovery container is prevented as well as maintaining the treating capacity for hydrogen purity and hydrogen recovery (variability).

Thereafter, simultaneously with closing the fourth valve 14, the second valve 12 is opened, whereby hydrogen gas having high purity, released from the hydrogen absorbing alloy in the hydrogen recovery container 20, is refluxed to the generator 1 through the product gas line 28. According to such construction, the apparatus is operated at a given interval at a hydrogen purity of, for example, about 99.98 % in the generator 1, and the operation is appropriately stopped so that the given hydrogen purity (about 99.98%) can be substantially maintained. Thus, by using only one hydrogen recovery container 20 and employing a batch system, hydrogen gas purity can be improved and maintained.

By conducting the above-described process for improving and maintaining hydrogen gas purity once or several times, a given amount of hydrogen gas containing a substantial amount of impure gas is collected in the auxiliary gas tank 2, which can then be discharged therefrom. That is, upon closing the first to third valves 11 to 13, the fourth valve 14 is opened, whereby the hydrogen gas containing a substantial amount of impure gas stored in the auxiliary gas tank 2 is occluded in the hydrogen recovery container 20. At that time, the hydrogen absorbing alloy in the hydrogen recovery container 20 is cooled by the cooling unit 8. After sufficiently flowing out the hydrogen gas containing a substantial amount of impure gas, the fourth valve 14 is closed.

Thereafter, hydrogen gas is released from the hydrogen recovery container 20 by heating the hydrogen absorbing alloy in the hydrogen recovery container 20 by means of a heating unit 7. In the initial stage of releasing hydrogen gas from this hydrogen recovery container 20, the third valve 13 is momentary opened so that the hydrogen gas containing a substantial amount of impure gas which was not occluded and, therefore, present within the hydrogen recovery container 20, is discharged outside through the purging gas line 30.

Simultaneously with closing the third valve 13, the second valve 12 is opened, whereby high purity hydrogen gas released from the hydrogen absorbing alloy is refluxed to the generator 1. According to such manner, by using one hydrogen recovery container 20 and auxiliary gas tank 2, the amount of purged gas discharged to the atmosphere can be decreased while still improving hydrogen recovery. By repeating the above process, the purity of hydrogen in the generator 1 is improved and kept substantially constant.

An additional process also can be effected. As shown by a hypothetical line in FIG. 1, the second auxiliary gas tank 2', is connected to the hydrogen recovery container 20 through the other recycling pipe 31 equipped with a fifth valve 15 having a switch function. Actually, regarding the hydrogen recovery container 20, the recycling pipe 31 is arranged nearer than the fourth valve 14 provided in the tank pipe 29.

The hydrogen gas containing a substantial amount of impure gas, supplied from the auxiliary gas tank 2 and collected around the hydrogen absorbing alloy within the hydrogen recovery container 20, is saved in the second auxiliary gas tank 2' by opening the fifth valve 15, instead of discharging outside through the purging gas line 30. The second auxiliary gas tank 2' has the [ ] same structure as that of the auxiliary gas tank 2.

Thereafter, high purity hydrogen gas released from the hydrogen absorbing alloy is refluxed to the generator 1. This process is effected once to several times. Thereafter, hydrogen gas containing a substantial amount of impure gas saved in the second auxiliary gas tank 2' is introduced into the hydrogen recovery container 20 and occluded therein. Then, in the initial stage during which hydrogen gas is released from the hydrogen recovery container 20, the third valve 13 is opened so that hydrogen gas containing much amount of impure gas may be purged outside through the purging gas line 30. Thereafter, high purity hydrogen gas released from the hydrogen absorbing alloy is refluxed to the generator 1. According to such construction, the amount of the hydrogen gas containing a substantial amount of impure gas discharged to the atmosphere can be noticeably decreased. Thus, hydrogen recovery can be further improved.

The hydrogen gas containing much amount of impure gas supplied from another gas tank 2' and collected around the hydrogen absorbing alloy in the hydrogen recovery container 20 can also be stored in still another gas tank without discharging outside through the purging gas line 30. Thereafter, the hydrogen gas containing a substantial amount of impure gas in still another gas tank is introduced into the hydrogen recovery container 20, and the hydrogen gas containing a substantial amount of impure gas alloy within the hydrogen recovery container 20 can be purged outside through the purging gas line 30. The term "outside", as used in the above description, includes the atmosphere and another gas tank.

As can be seen from the above explanation, according to the hydrogen purity improving method and the apparatus for effecting the same of the present invention, the following can be achieved.

According to the present invention, in the initial stage during which hydrogen gas is released from a hydrogen recovery container, initially purged hydrogen gas containing a substantial amount of impure gas is introduced from the hydrogen recovery container into a gas tank and stored therein,. Thereafter, the hydrogen gas containing a substantial amount of impure gas saved in the gas tank is introduced into the hydrogen recovery container and occluded therein. Then, in the initial stage during which hydrogen gas is released from the hydrogen recovery container, the hydrogen gas containing a substantial amount of impure gas is discharged outside. After that, high purity hydrogen gas released from a hydrogen absorbing alloy in the hydrogen recovery container is refluxed to the generator.

According to such construction, the number of a hydrogen recovery containers accommodating a hydrogen absorbing alloy can be decreased and, therefore, the apparatus has a simple construction providing a low cost and superior maintenance. Further, hydrogen recovery can be sufficiently improved as well. Additionally, since hydrogen gas containing a substantial amount of impure gas which is not occluded in a hydrogen absorbing alloy in the hydrogen recovery container is introduced into a gas tank which does not contain a hydrogen absorbing alloy, harmful contact between oxygen or water and the hydrogen absorbing alloy is reduced compared with a case where hydrogen gas containing a substantial amount of impure gas is introduced into the hydrogen recovery container comprising the hydrogen absorbing alloy. According to this construction, early deterioration of the hydrogen absorbing alloy contained in the hydrogen recovery container can be reduced as well as maintaining the treating capacity for keeping hydrogen purity and hydrogen recovery (variability).

According to the present invention, hydrogen gas containing a substantial amount of impure gas stored in a gas tank is introduced into a hydrogen recovery container and occluded therein. Thereafter, in the initial stage during which hydrogen gas is released from the hydrogen recovery container, the hydrogen gas containing a substantial amount of impure gas is stored in another gas tank. Further, the hydrogen gas containing a substantial amount of impure gas stored in another gas tank is introduced into the hydrogen recovery container and occluded therein. Then, in the initial stage during which hydrogen gas is released from the hydrogen recovery container, the hydrogen gas containing a substantial amount of impure gas is discharged outside. Following that, hydrogen gas having high purity released from a hydrogen absorbing alloy in the hydrogen recovery container is refluxed to an generator.

According to such construction, hydrogen recovery can be further raised.

What is claimed is:

1. A method for improving hydrogen purity comprising:
   (a) providing a feed gas containing unpurified hydrogen from a hydrogen utilizing apparatus to a hydrogen recovery container, said hydrogen recovery container having within a hydrogen absorbing alloy for absorbing hydrogen in the form of a hydride;
   (b) absorbing hydrogen in the hydrogen absorbing alloy from the feed gas;
   (c) releasing purified hydrogen from the hydrogen absorbing alloy in the form of a gas such that the hydrogen recovery container has therein purified and residual unpurified hydrogen gas;
   (d) releasing said residual unpurified hydrogen gas from the hydrogen recovery container to a storage tank for storage therein;
   (e) refluxing the purified hydrogen from the hydrogen recovery container to the hydrogen utilizing apparatus;
   (f) repeating steps (a) through (e) at least once until said storage tank has a predetermined amount of residual unpurified hydrogen gas;
   (g) recycling the residual unpurified hydrogen gas from the storage tank to the hydrogen recovery container;
   (h) absorbing hydrogen in the hydrogen absorbing alloy from the residual unpurified hydrogen gas;
   (i) releasing the absorbed hydrogen from the hydrogen absorbing alloy in the form of a gas such that said hydrogen recovery container has therein secondary purified and secondary residual unpurified hydrogen gas;
   (j) discharging said secondary residual unpurified hydrogen gas to a remote location; and,
   (k) refluxing the secondary purified hydrogen gas from the hydrogen recovery container to the hydrogen utilizing apparatus.

2. The method for improving hydrogen purity according to claim 1, wherein said remote location is the atmosphere.

3. The method for improving hydrogen purity according to claim 1, wherein said remote location is an auxiliary storage tank.

4. The method for improving hydrogen purity according to claim 3, further comprising:
   (1) repeating steps (g) through (k) at least once until said auxiliary storage tank has a predetermined amount of secondary residual unpurified hydrogen gas;
   (m) recycling the secondary residual unpurified hydrogen gas from the auxiliary storage tank to the hydrogen recovery container;
   (n) absorbing hydrogen in the hydrogen absorbing alloy from the secondary residual unpurified hydrogen gas;
   (o) releasing the absorbed hydrogen from the hydrogen absorbing alloy in the form of a gas such that said hydrogen recovery container has therein tertiary purified and tertiary residual unpurified hydrogen gas;
   (p) discharging said tertiary residual unpurified hydrogen gas to the outside; and
   (q) refluxing the tertiary purified hydrogen gas from the hydrogen recovery container to the hydrogen utilizing apparatus.

5. An apparatus for improving hydrogen purity comprising:
   a hydrogen utilizing apparatus having an inlet and an outlet;
   a hydrogen recovery container connected with said outlet of said hydrogen utilizing apparatus through a first pipe, said hydrogen recovery container having with a hydrogen absorbing alloy for absorbing hydrogen in the form of a hydride;
   a first valve provided in said first pipe, said first valve having a switch function;
   a product gas line connecting the hydrogen recovery container with said inlet of said hydrogen utilizing apparatus;
   a second valve provided in said product gas line, said second valve having a switch function;
   a gas storage tank connected with the hydrogen recovery container through a first tank pipe;
   a third valve provided in said first tank pipe, said third valve having a switch function;
   a purging gas line connected with the hydrogen recovery container for releasing a gas to a remote location;
   a fourth valve provided in said purging gas line, said fourth valve having a switch function; and
   a controller for recycling a contents of said gas storage tank to said hydrogen recovery container.

6. The apparatus for improving hydrogen purity according to claim 5, wherein said remote location is the atmosphere.

7. The apparatus for improving hydrogen purity according to claim 5, wherein said remote location is an auxiliary storage tank.

* * * * *